United States Patent [19]

Shinohara et al.

[11] Patent Number: 4,883,929
[45] Date of Patent: Nov. 28, 1989

[54] BARRIER ASSEMBLY FOR MOUNTING CONTROLLING DEVICES

[75] Inventors: Kenji Shinohara, Osaka; Takashi Niwa, Kyoto; Yoshihiro Wakatsuki, Shimane, all of Japan

[73] Assignee: Omron Tateisi Electronics Co., Kyoto, Japan

[21] Appl. No.: 166,089

[22] Filed: Mar. 9, 1988

[30] Foreign Application Priority Data

Mar. 17, 1987 [JP] Japan ............................. 62-39780[U]
Jun. 22, 1987 [JP] Japan ............................. 62-95609[U]

[51] Int. Cl.⁴ ............................................ H01H 9/08
[52] U.S. Cl. ..................................... 200/5 R; 200/296; 361/350
[58] Field of Search ............... 200/5 R, 314, 307, 296, 200/295; 248/27.1; 361/346, 347, 348, 350, 351; 439/557

[56] References Cited

U.S. PATENT DOCUMENTS 2,935,653  5/1960  Campe et al. .................. 200/296
3,049,646  8/1962  Cox, Jr. ....................... 200/307 X
3,091,795  6/1963  Budwig ........................ 439/557 X

FOREIGN PATENT DOCUMENTS 1810197  6/1970  Fed. Rep. of Germany .
2029491  1/1971  Fed. Rep. of Germany .
1530858  6/1968  France .

Primary Examiner—A. D. Pellinen
Assistant Examiner—Morris Ginsburg
Attorney, Agent, or Firm—Wegner & Bretschneider

[57] ABSTRACT

A barrier assembly includes an intermediate barrier member which is inserted from the front side of a mounting panel and a fixing barrier member which is inserted from the rear side of the panel and connected to the intermediate barrier member. After a plurality of small-sized controlling devices has been secured to the mounting panel, the intermediate barrier member is inserted into the area between each pair of adjacent controlling devices from the front side of the panel. Then, the fixing barrier member is inserted into this area from the rear side of the panel and connected to the intermediate barrier member. Thus, it is possible to prevent the intermediate barrier member from being pulled out forward of the panel and also from being withdrawn rearward of the panel by virtue of the fitting engagement with the fixing barrier member. It is possible to remove the two barrier members toward the opposite directions, from which they are inserted when assembled, by disengaging them from each other.

7 Claims, 4 Drawing Sheets

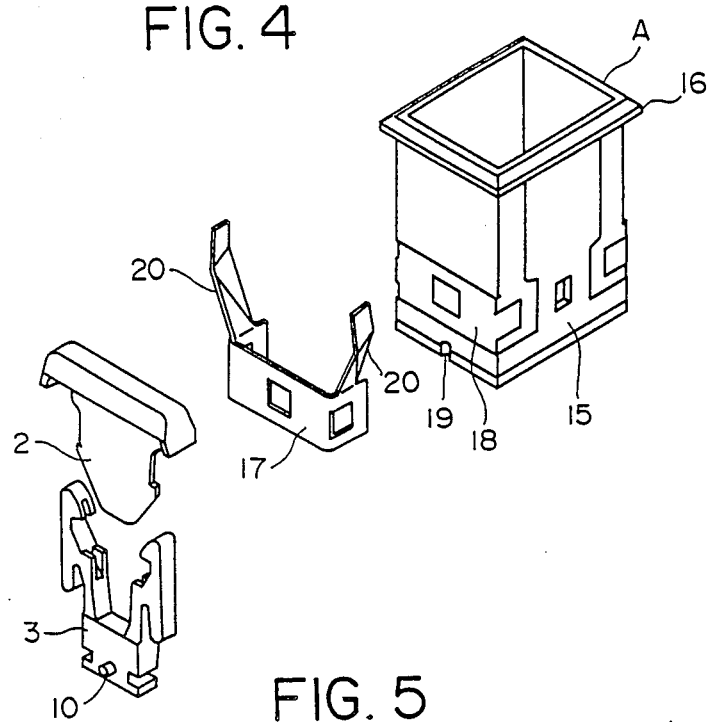
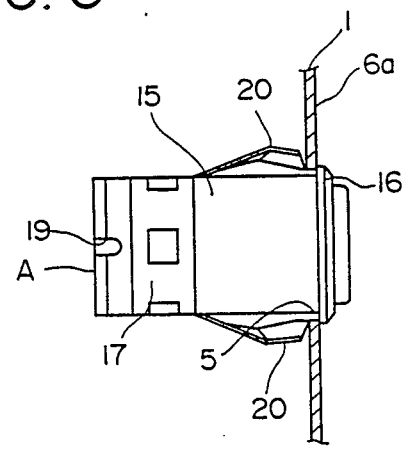
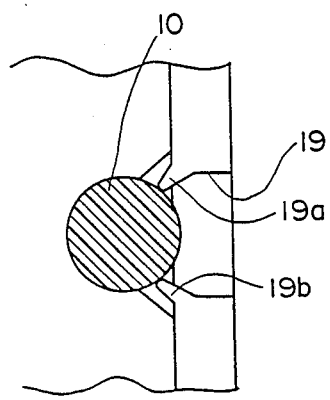

BARRIER ASSEMBLY FOR MOUNTING CONTROLLING DEVICES

FIELD OF THE INVENTION

This invention relates to a barrier assembly which may be employed in, for example, a ticket machine for transportation, in order to partition off controlling devices which are adjacent to each other when a plurality of controlling devices such as pushbutton switches or display lamps is arrayed in a line within a mounting opening provided in a mounting panel of the ticket machine.

BACKGROUND OF THE INVENTION

In the above-described ticket machine, a plurality of illuminated button switches that indicate fares to respective destinations is provided on a mounting panel, and when one of the pushbutton switches is pressed, the machine issues a ticket which is printed with an amount of money corresponding to the pressed switch.

In general, a multiplicity of pushbutton switches is arrayed on a mounting panel in a line longitudinally, laterally or in both the longitudinal and lateral directions thereof. More specifically, the pushbutton switches are mounted within respective openings provided in the mounting panel in such a manner that the fare indicating surfaces are exposed to the outside. Accordingly, the mounting panel must be provided with a number of openings which corresponds to the number of pushbutton switches required. In the case where the pushbutton switches are arrayed in a line, it is better from the viewpoint of machining to provide a large opening in the panel and to fit a plurality of aligned pushbutton switches into the opening.

In such a case, as shown in FIG. 9, each of the barriers 31 (32) is interposed between each pair of adjacent pushbutton switches A in order to partition off them from each other.

There are two types of barrier, i.e.: a first type of barrier 31 (shown in FIGS. 10A and 10B) in which, after the pushbutton switches A have been fitted into the mounting opening in the mounting panel, the barriers 31 are inserted between the pushbutton switches A from the front side of the panel, and a second type of barrier 32 (shown in FIGS. 11A and 11B) in which the barriers 32 are previously attached to the respective pushbutton switches A in one unit and this pushbutton switch assembly is secured to the mounting panel.

In the first type of barrier 31, after the pushbutton switches have been fitted into the mounting opening, the barriers 31 are inserted from the front side of the panel. Retaining step portions 33 shown in FIGS. 10A and 10B are engaged with the side surfaces of the switches, thereby preventing the pushbutton switches from being pulled out forward of the panel. Further, since the step portions 33 prevent the barriers 31 from being pulled out forward of the panel after they have been inserted, the barriers 31 must be broken when the pushbutton switches are replaced. Therefore, replacement requires much time and labor, and since the barriers 31 cannot be reused, the cost increases accordingly.

In the second type of conventional barrier 32, relatively large projections 34 which engage with pushbutton switches A are provided in order to prevent the switches A from being pulled out forward of the panel, and a relatively large flange 35 is provided in order to prevent the switches A from withdrawing rearward of the panel. Accordingly, it is impossible to insert individually the barrier 32, from the front side of the panel unlike the case of the first type of barrier 31. More specifically, it is necessary to first attach barriers 32 to pushbutton switches A and connect together a necessary number of such pushbutton switches A in one unit and then secure this pushbutton switch assembly to the panel. Therefore, this prior art barrier is quite inefficient.

SUMMARY OF THE INVENTION

Accordingly, it is an object of the present invention to provide a barrier assembly which facilitates the mounting operation.

It is another object of this invention to provide a barrier assembly which is so designed that there is no fear of the assembly being pulled out forward of the panel.

It is still another object of this invention to provide a barrier assembly which can be readily removed.

It is a further object of this invention to provide a barrier assembly which can be reused.

According to this invention, there is provided a barrier assembly designed to array a plurality of controlling devices in a line within an opening provided in a mounting panel and to partition off controlling devices which are adjacent to each other. This barrier assembly includes an intermediate barrier member which is inserted from the front side of the panel and a fixing barrier member which is inserted from the rear side of the panel and connected to the intermediate barrier member.

BRIEF DESCRIPTION OF THE DRAWINGS

The above and other objects, advantages and features of this invention will be more fully understood when considered in conjunction with the following figures, of which:

FIG. 4 is a perspective view showing the relationship between the barrier assembly and a switch casing;

FIG. 5 is a side view of the switch casing in a mounted state;

FIG. 6 is an enlarged view of an engagement bore formed in the switch casing;

DETAILED DESCRIPTION OF THE INVENTION

A first embodiment of this invention will be described hereunder with reference to the accompanying drawings.

Figure 1:
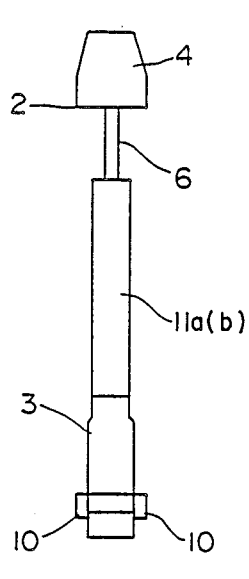
FIG. 1 is a side view showing a barrier assembly according to a first embodiment of this invention in a connected state.
Figure 2:
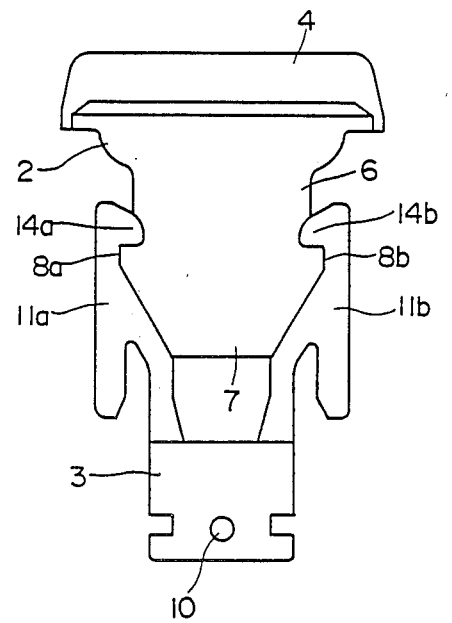
FIG. 2 is a front view of the barrier assembly shown in FIG. 1.

FIGS. 1 and 2 show a barrier for pushbutton switches. The barrier comprises an intermediate barrier member 2 defining a first barrier member which is inserted from the front side of a mounting panel 1 (shown in FIG. 5) and a fixing barrier member 3 defining a second barrier member which is inserted from the rear side of the panel 1.

The intermediate barrier member 2 has a flange portion 4 defined by an enlarged front end portion. When the barrier member 2 is inserted into a pushbutton switch mounting opening 5 provided in the panel 1 shown in FIG. 5, the flange portion 4 abuts against and engages with the panel surface 6a, thereby preventing the barrier member 2 from being pushed further into the opening 5. The intermediate barrier member 2 has a thin-walled main body portion 6 which is contiguous with the flange portion 4, the body portion 6 being inserted into the opening 5. The width of the distal end portion 7 of the body portion 6 is gradually reduced so that the end portion has a substantially trapezoidal shape, and engagement projections 8a and 8b are provided on both sides, respectively, of the distal end portion 7.

On the other hand, the fixing barrier member 3 has a pin 10 projecting from each side surface thereof so as to engage with a switch casing 15 (see FIGS. 4 and 5) of a pushbutton switch A. The fixing barrier member 3 further has two arms 11a and 11b extending toward the intermediate barrier member 2 so that the main body portion 6 of the intermediate barrier member 2 is fitted into the space defined between the arms 11a and 11b. The arms 11a and 11b have a larger thickness than that of the main body portion 6 of the intermediate barrier member 2.

Figure 3:
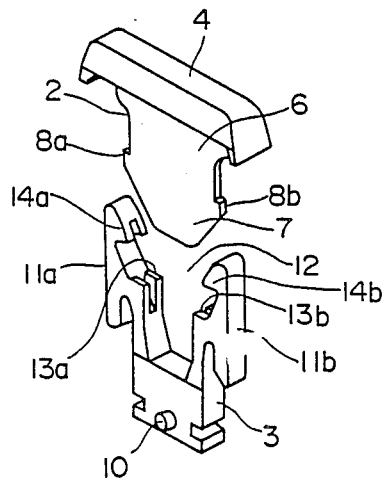
FIG. 3 is a perspective view of the barrier assembly in a disassembled state.

Accordingly, the fitting space 12 (shown in FIG. 3) defined between the arms 11a and 11b also has a substantially trapezoidal shape. Further, grooves 13a and 13b for guiding and accommodating the distal end portion 7 of the intermediate barrier member 2 are provided in the respective inner sides of the arms 11a a and 11b.

The arms 11a and 11b further have at their respective distal ends projections 14a and 14b which, extend toward each other. When the intermediate and fixing barrier members 2 and 3 are in fitting engagement with each other, the projections 14a and 14b are in engagement with the respective engagement projections 8a and 8b of the intermediate barrier member 2 to maintain the fitting engagement against external force.

As shown in FIG. 4, the switch casing 15 for accommodating a pushbutton switch A is provided with a pair of leaf springs 20 for maintaining the position of the switch casing 15 attached to the mounting panel 1, as shown in FIG. 5. As will be clear from FIG. 5, a flange portion 16 which is provided along the outer periphery of the forward end of the switch casing 15 is brought into abutting engagement with the panel surface 6a. In this state, the respective distal ends of the leaf springs 20 are brought into resilient contact with the rear surface of the panel 1, thereby securing the switch casing 15, that is, the pushbutton switch A, to the mounting panel 1.

In the case of the arrangement shown in FIG. 4, the leaf springs 20 are formed integrally with a U-shaped frame 17 and are therefore mounted on the switch casing 15 by rigidly fitting the frame 17 into a recess 18 formed in the outer surface of the casing 15.

Further, an engagement bore 19 is provided in the rear end portion of each side of the switch casing 15. The bore 19 is engageable with the engagement pin 10 provided on the fixing barrier member 3.

Prior to the mounting of the barrier assembly, the switch casing 15 and the pushbutton switch A are secured to the mounting panel 1 using the flange portion 16 and the leaf springs 20 as described above, as shown in FIG. 5.

Next, the fixing barrier member 3 is inserted from the rear side of the panel 1 and thereafter the intermediate barrier member 2 is inserted from the front side of the panel 1, and then the barrier members 2 and 3 are fitted to each other.

In this fitting, the intermediate and fixing barrier members 2 and 3 are moved relative to each other in such a manner that the distal end portion 7 of the intermediate barrier member 2 enters the fitting space 12 and the grooves 13a, 13b while opening the resilient arms 11a and 11b of the fixing barrier member 3. After the distal end portion 7 has entered the space 12, the arms 11a and 11b return to their previous positions, so that the projections 14a and 14b of the fixing barrier member 3 are respectively engaged with the projections 8a and 8b of the intermediate barrier member 2. As a result, the barrier members 2 and 3 are connected together, as shown in FIGS. and 2, thus maintaining the fitting engagement against external force.

The pin 10 provided on the fixing barrier member 3 is engaged with the bore 19 provided in the switch casing 15, thereby securing the fixing barrier member 3 and hence the intermediate barrier member 2 to the casing 15.

By virtue of the above-described arrangement, since the flange portion 4 of the intermediate barrier member 2 is in abutting engagement with the panel surface 6a, even if an external force acts on the intermediate barrier member 2 from the front side of the panel 1 in such a manner that the barrier member 2 is forced toward the rear side of the panel 1, there is no fear of the intermediate barrier member 2 and the fixing barrier member 3 fitted thereto withdrawing rearward of the panel 1.

Conversely, when an external force acts on the intermediate barrier member 2 in the direction in which it is pulled out, since the fixing barrier member 3 is rigidly secured to the switch casing 15 by virtue of the engagement structure consisting of the engagement pin 10 and the engagement bore 19, and since the intermediate barrier member 2 is fitted to the fixing barrier member 3 in such a manner that it is prevented from coming off by the engagement structure consisting of the projections 8a, 8b and the projections 14a, 14b, the barrier members 2 and 3 are prevented from being pulled out.

When it is necessary to disassemble the barrier assembly, for example, in order to replace the pushbutton switch A, the fixing barrier member 3 is first disengaged from the intermediate barrier member 2 (i.e., the arms 11a and 11b are expanded outward) and removed rearward of the panel 1 and then the intermediate barrier member 2 is pulled forward of the panel 1. Accordingly, it is possible to remove the barrier assembly and replace the pushbutton switch A without damaging the barrier members 2 and 3.

Thus, the barrier assembly according to the foregoing embodiment facilitates mounting and removal of the pushbutton switch A and the barrier members 2, 3. In addition, it is advantageously possible to eliminate the fear that the barrier members 2, 3 may be pulled out forward of the panel 1 or withdrawn rearward of the panel 1 in actual use. Further, since the barrier assembly can be reused, the cost is lowered accordingly.

Another embodiment of engagement bore 19 is shown in FIG. 6 wherein a pair of resilient projections 19a and 19b are formed at the edge of the engagement bore 19 to prevent the engagement pin 10 from disengaging from the bore 19.

Figure 7:
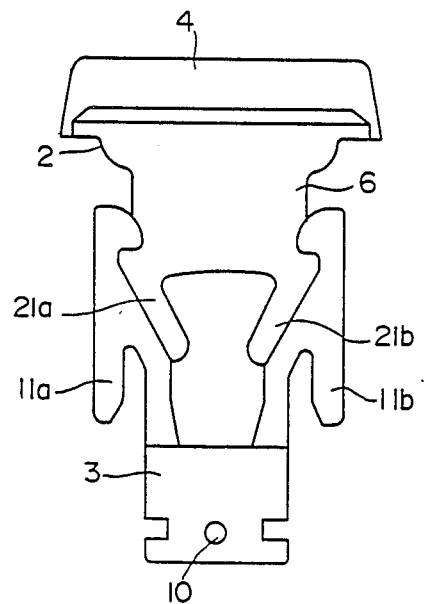
FIG. 7 is a front view of a barrier assembly according to a second embodiment of this invention.
Figure 8:
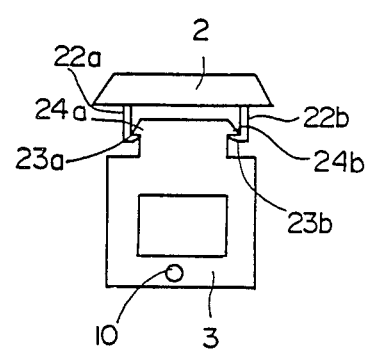
FIG. 8 is a front view of a barrier assembly according to a third embodiment of this invention.
Figure 9:
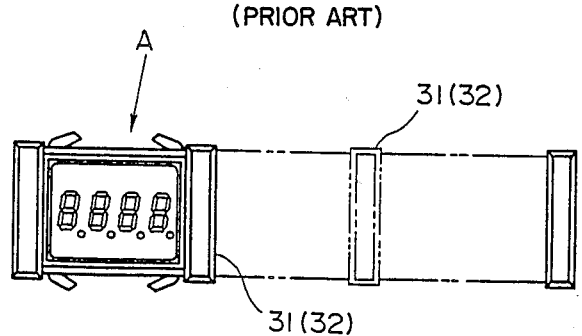
FIG. 9 is a front view of a barrier and switch structure known in the prior art.
Figure 10A:
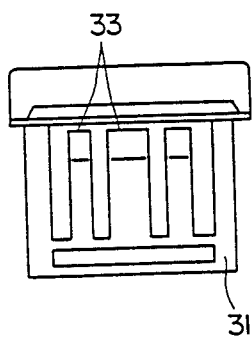
FIGS. 10A and 10B are plan and side views, respectively, of one form of barrier known in the prior art.
Figure 10B:
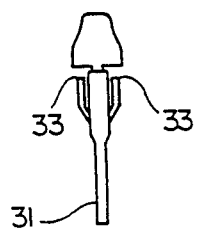
Figure 11A:
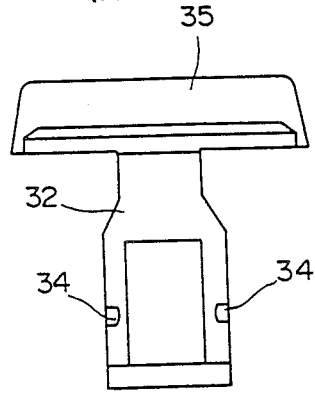
FIGS. 11A and 11B are plan and partial sectional side views, respectively, of another form of barrier known in the prior art.
Figure 11B:
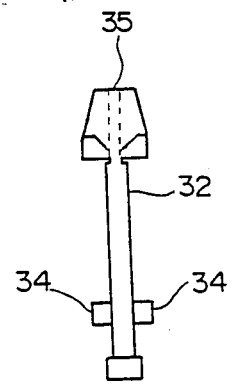

FIGS. 7 and 8 respectively show second and third embodiments of this invention. In the embodiment shown in FIG. 7, the distal end portion of the intermediate barrier member 2 is formed into two arms 21a and 21b in correspondence with the two arms 11a and 11b of the fixing barrier member 3, thereby imparting resilience to the intermediate barrier member 2. Accordingly, when the two barrier members 2 and 3 are in fitting engagement with each other, an outward resilient force is derived from the intermediate barrier member 2.

In the embodiment shown in FIG. 8, the intermediate barrier member 2 is provided with two arms 22a, 22b and distal end projections 23a, 23b, while the fixing barrier. member 3 is provided with engagement projections 24a and 24b, in reverse relation to the arrangement shown in FIGS. 1 and 2.

The above description and the accompanying drawings are merely illustrative of the application of the principles of the present invention and are not limiting. Numerous other arrangements which embody the principles of the invention and which fall within its spirits and scope may be readily devised by those skilled in the art. Accordingly, the invention is not limited by the foregoing description, but is only limited by the scope of the appended claims.

What is claimed is:

1. A barrier assembly comprising:
   a mounting panel with an opening therein;
   a pluralty or controlling devices;
   a first barrier member which is inserted from the front side of a mounting panel; and
   a second barrier member which is inserted from the rear side of said mounting panel and connected to said first barrier member;
   said first barrier member being snap-fit to said second barrier member and said barrier assembly holding said plurality of controlling devices in a line within said opening and partitioning off said controlling devices which are adjacent to each other.

2. A barrier assembly according to claim 1, wherein said second barrier member has arms provided on both sides thereof, each arm having an engagement portion provided at its, distal end, and said first barrier member has projections provided on both sides thereof which are engageable with said engagement portions.

3. A barrier assembly according to claim 1, wherein said first barrier member is formed with a flange member which is engageable with said panel, and said second barrier member is formed with a groove for guiding and accommodating a distal end portion of said first barrier member.

4. A barrier assembly according to claim I, wherein each of said controlling devices has a casing having an engagement recess formed in one side surface thereof, and said second barrier member has a projection formed on one side thereof for engaging with said engagement recess.

5. A barrier assembly according to claim 4, wherein a stopper for preventing said second barrier member from coming off is formed on the inner surface of the engagement recess formed in said casing.

6. A barrier assembly according to claim 1, wherein said second barrier member has arms provided on both sides thereof, each arm having an engagement portion provided at its distal end, and said first barrier member has arms provided on both sides thereof, each arm having a projection which is engageable with said engagement portion.

7. A barrier assembly according to claim 1, wherein said first barrier member has arms provided on both sides thereof, each arm having an engagement portion provided at its distal end, and said second barrier member has projections provided on both sides thereof which are engageable with said engagement portions.

* * * * *